United States Patent
Snell et al.

(10) Patent No.: US 11,531,307 B2
(45) Date of Patent: Dec. 20, 2022

(54) BRAKE SYSTEM FOR A COMPRESSOR

(71) Applicant: Johnson Controls Technology Company, Auburn Hills, MI (US)

(72) Inventors: Paul William Snell, York, PA (US); Matthew Lee Heisey, York, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 456 days.

(21) Appl. No.: 16/591,275

(22) Filed: Oct. 2, 2019

(65) Prior Publication Data
US 2021/0102720 A1 Apr. 8, 2021

(51) Int. Cl.
| | |
|---|---|
| *F24F 11/66* | (2018.01) |
| *F24F 11/67* | (2018.01) |
| *G05B 13/02* | (2006.01) |
| *F25B 1/053* | (2006.01) |
| *F25B 49/02* | (2006.01) |

(52) U.S. Cl.
CPC ............ *G05B 13/021* (2013.01); *F24F 11/66* (2018.01); *F24F 11/67* (2018.01); *F25B 1/053* (2013.01); *F25B 49/025* (2013.01)

(58) Field of Classification Search
CPC .......... F24F 11/30; F24F 11/66; G05B 13/021
USPC ........................................................ 700/276
See application file for complete search history.

(56) References Cited

U.S. PATENT DOCUMENTS

2016/0222882 A1* 8/2016 Harada ..................... F03G 6/00

FOREIGN PATENT DOCUMENTS

| GB | 939304 A | 10/1963 |
| WO | 2014074448 A1 | 5/2014 |

OTHER PUBLICATIONS

PCT International Search Report and Written Opinion for PCT Application No. PCT/US2020/053862 dated Jan. 25, 2021, 11 pgs.

* cited by examiner

*Primary Examiner* — Jigneshkumar C Patel
(74) *Attorney, Agent, or Firm* — Fletcher Yoder, P.C.

(57) ABSTRACT

A heating, ventilation, and/or air conditioning (HVAC) system includes a compressor having an impeller configured to rotate and drive a working fluid through a working fluid circuit of the HVAC system in an active operating mode. The HVAC system further includes a controller configured to, in response to receiving an input indicative of a transition to operate in an inactive operating mode, suspend the active operating mode by interrupting a supply of power to the compressor, adjust pre-rotation vanes of the compressor, a variable geometry diffuser of the compressor to a first position, or both to enable a backflow of the working fluid through the compressor for a first interval of time, and, after the first interval of time has elapsed, adjust the pre-rotation vanes, the variable geometry diffuser, or both to a second position to block the backflow of the working fluid through the compressor.

20 Claims, 8 Drawing Sheets

BRAKE SYSTEM FOR A COMPRESSOR

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Chiller systems, or vapor compression systems, utilize a working fluid, typically referred to as a refrigerant, which changes phases between vapor, liquid, and combinations thereof, in response to exposure to different temperatures and pressures associated with operation of the vapor compression system. For example, a heating, ventilation, air conditioning (HVAC) system or a heating, ventilation, air conditioning, and refrigeration (HVAC&R) system may include a chiller, which is a type of vapor compression system, configured to place the working fluid in a heat exchange relationship with a conditioning fluid. The HVAC&R system may include a compressor that pressurizes the working fluid to circulate the working fluid through various components of the HVAC&R system, thereby enabling the working fluid to undergo phase changes. For example, the compressor may include an impeller configured to rotate and compress the working fluid to direct the working fluid through the components of the HVAC&R system. However, it may be difficult to quickly reduce the rotational speed of the impeller to near-zero, such as when the HVAC&R system transitions from an active operating mode to an inactive operating mode.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) system includes a compressor having an impeller configured to rotate and drive a working fluid through a working fluid circuit of the HVAC system in an active operating mode of the HVAC system. The HVAC system further includes a controller configured to, in response to receiving an input indicative of a transition of the HVAC system to operate in an inactive operating mode, suspend the active operating mode of the HVAC system by interrupting a supply of power to the compressor, adjust pre-rotation vanes of the compressor, a variable geometry diffuser of the compressor to a first position, or both to enable a backflow of the working fluid through the compressor for a first interval of time, and, after the first interval of time has elapsed, adjust the pre-rotation vanes of the compressor, the variable geometry diffuser of the compressor, or both to a second position to block the backflow of the working fluid through the compressor.

In one embodiment, a heating, ventilation, and/or air conditioning (HVAC) system includes a compressor having an impeller configured to rotate and direct a flow of working fluid through a working fluid circuit of the HVAC system, a motor configured to drive the impeller to rotate, and a controller communicatively coupled to the motor. The controller is configured to manage supply of power to the motor to drive the impeller to rotate in an active operating mode of the HVAC system, receive an indication to operate the HVAC system in an inactive operating mode, interrupt the supply of power to the motor in response to receipt of the indication to operate the HVAC system in the inactive operating mode, and adjust pre-rotation vanes and/or a variable geometry diffuser of the compressor to enable a backflow of the working fluid through the impeller for a first interval of time. The backflow of the working fluid includes a flow of the working fluid from a condenser disposed along the working fluid circuit, through the impeller, and toward an evaporator disposed along the working fluid circuit in response to receipt of the indication to operate the HVAC system in the inactive operating mode. The controller is further configured to adjust the pre-rotation vanes and/or the variable geometry diffuser to block the backflow of the working fluid through the impeller for a second interval of time after the first interval of time.

In one embodiment, a tangible, non-transitory, computer-readable medium includes executable instructions that, when executed by a processor in response to receiving an input indicative of a transition of a heating, ventilation, and/or air conditioning (HVAC) system to operate in an inactive operating mode, are configured to cause the processor to suspend operation of a compressor of the HVAC system in order to operate the HVAC system in the inactive operating mode, in which the compressor has an impeller configured to rotate and thus drive a working fluid through a working fluid circuit of the HVAC system. The instructions, when executed by the processor, are further configured to cause the processor to receive feedback from a sensor indicative of an operating parameter of the compressor and adjust a position of a fluid flow adjustment feature of the compressor to adjust a flow rate of the working fluid through the compressor based on the feedback received from the sensor in the inactive operating mode of the HVAC system.

DRAWINGS

Various aspects of this disclosure may be better understood upon reading the following detailed description and upon reference to the drawings in which.

Figure 7:
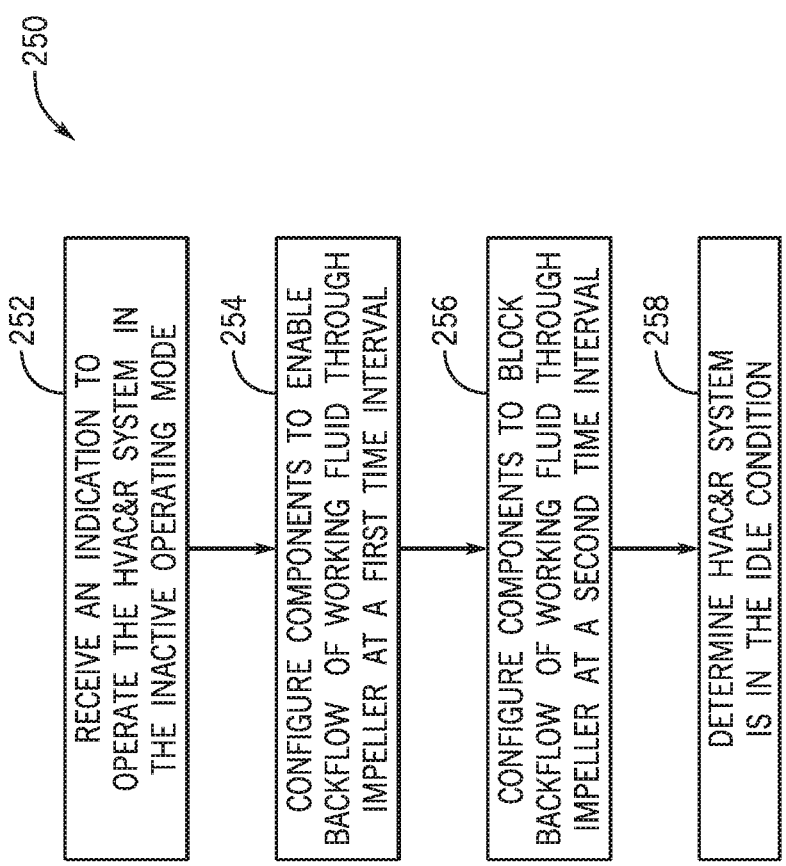
Figure 8:
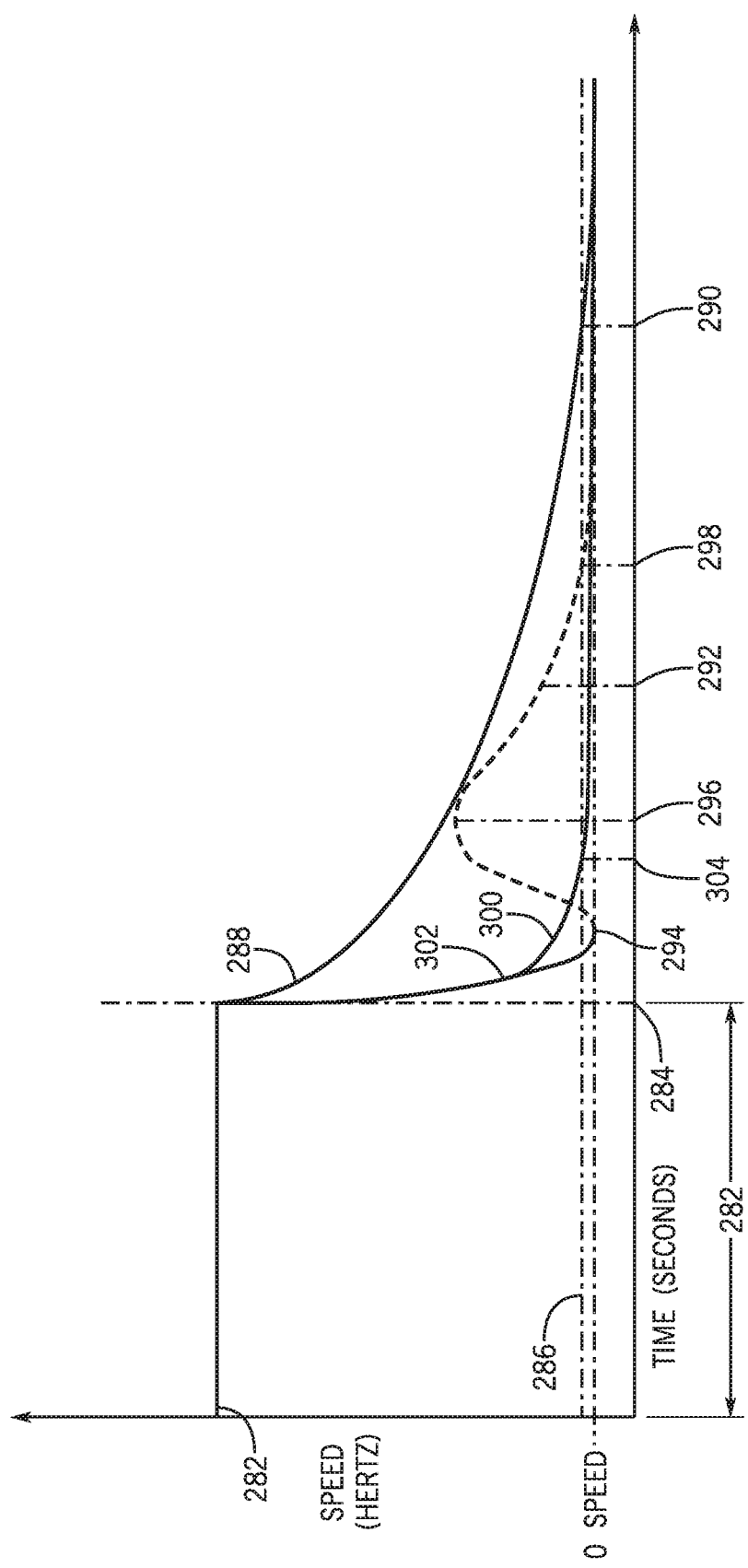

FIG. 7 is a flowchart of an embodiment of a method for operating an improved braking system of a compressor, in accordance with an aspect of the present disclosure; and FIG. 8 is a graphical illustration of an embodiment of a speed of a compressor controlled by an improved braking system as an HVAC&R system transitions from an active operating mode to an inactive operating mode, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to an HVAC&R system having a compressor that uses an impeller (e.g., driven by a motor) to pressurize and circulate a working fluid through components of the HVAC&R system. For example, during an active operating mode or state of the HVAC&R system, the impeller may be driven (e.g., by the motor) to draw the working fluid from an evaporator of the HVAC&R system into the compressor and then direct the working fluid toward a condenser of the HVAC&R system. The HVAC&R system may also include an inactive operating mode or state, in which the impeller may not be driven (e.g., the motor does not apply torque to the impeller), and thus, the impeller rotational speed is reduced and/or the impeller is in an idle position.

As used herein, an active operating mode of the HVAC&R system refers to a state of the HVAC&R system in which the compressor actively directs the working fluid through the HVAC&R system, such as to cool the conditioning fluid. Additionally, an inactive operating mode of the HVAC&R system refers to a state of the HVAC&R system in which the compressor is shut down and/or does not actively direct the working fluid through the HVAC&R system. As an example, the HVAC&R system may transition from the active operating mode to the inactive operating mode for maintenance (e.g., to replace a component of the HVAC&R system), when a load demand of the HVAC&R system is relatively low, when there is no load demand on the HVAC&R system, and so forth. After the HVAC&R system has transitioned to the inactive operating mode, the active operating mode may not be initialized until the HVAC&R system has reached an idle state. For instance, the idle state may include a rotational speed of the impeller of the compressor falling below a threshold rotational speed.

However, reducing the rotational speed of the impeller below the threshold rotational speed may be time-consuming. For example, during the inactive operating mode, the rotational speed of the impeller may gradually decrease over time (e.g., as a result of the motor not applying torque to the impeller) and eventually fall below the threshold rotational speed. In some cases, an amount of time that passes before the HVAC&R system can initiate the active operating mode may be relatively long, and may limit an ability of the HVAC&R system to effectively condition a space (e.g., a room, a building, a house, or another suitable space). Moreover, implementing an additional component with the compressor to reduce the speed of the impeller (e.g., brakes that apply friction to the impeller) may be costly and/or may impact a structural integrity of the impeller.

Accordingly, the present disclosure relates to an improved braking system that may quickly reduce the rotational speed of the impeller below the threshold rotational speed, thereby increasing an efficiency of the HVAC&R system. In certain embodiments, the HVAC&R system may utilize the braking system when transitioning between the active operating mode and the inactive operating mode. The braking system may use a flow of the working fluid of the HVAC&R system to reduce the rotational speed of the impeller. For example, during the inactive operating mode, the HVAC&R system may be configured to direct a flow of the working fluid in a direction opposite a direction of working fluid flow in the active operating mode (e.g., backflow from the condenser through the compressor and toward the evaporator). This direction of flow of the working fluid through the compressor may impart a rotational force on the impeller that is opposite a rotational direction of the impeller during the active operating mode to quickly reduce the rotational speed of the impeller. Thus, the braking system may enable the HVAC&R system to reduce the rotational speed of the impeller below the threshold rotational speed, such that the impeller reaches an idle state (e.g., a non-rotational state) more quickly when compared to conventional techniques.

Figure 1:
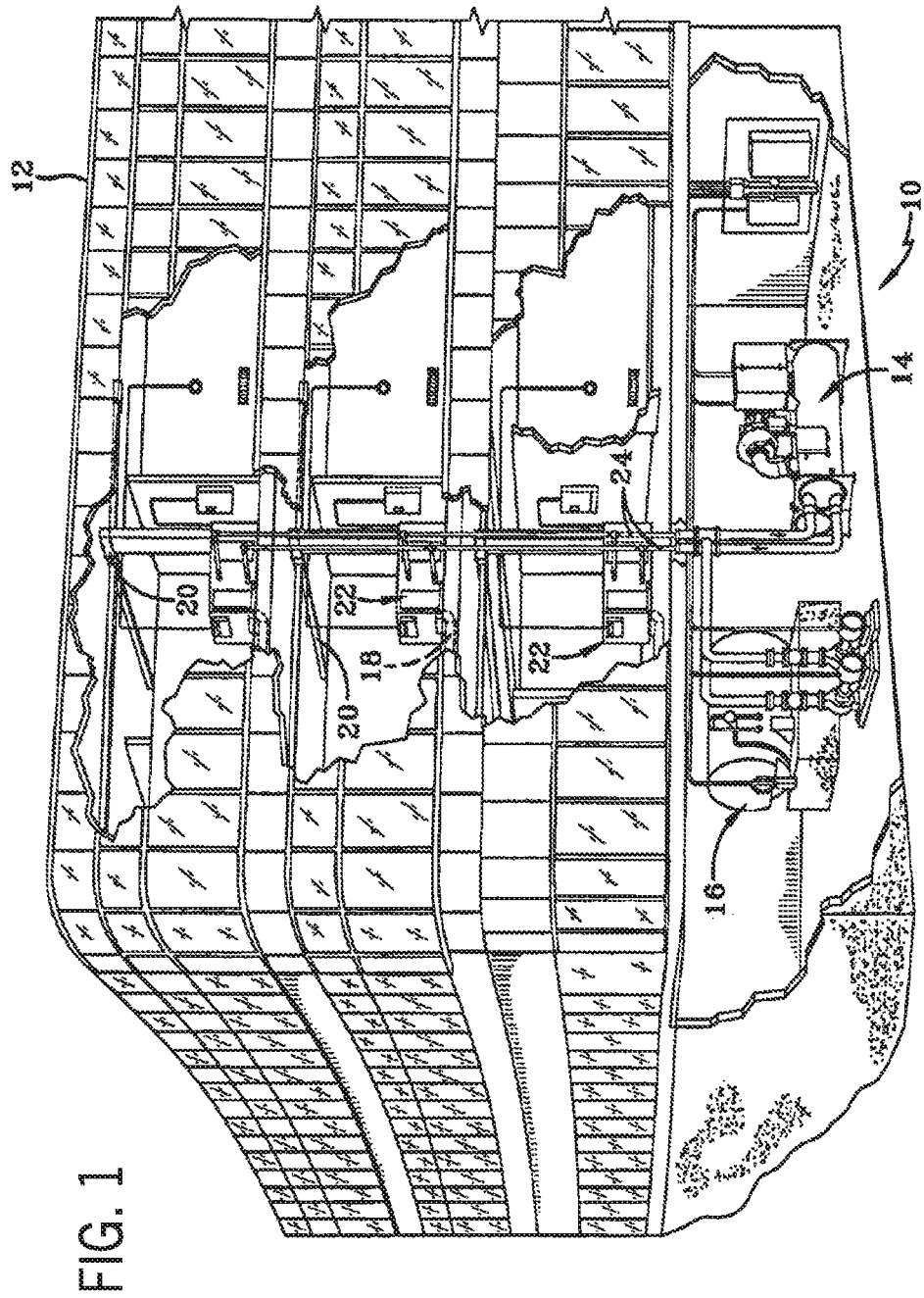
FIG. 1 is a perspective view of a building that may utilize an embodiment of a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, and air conditioning (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
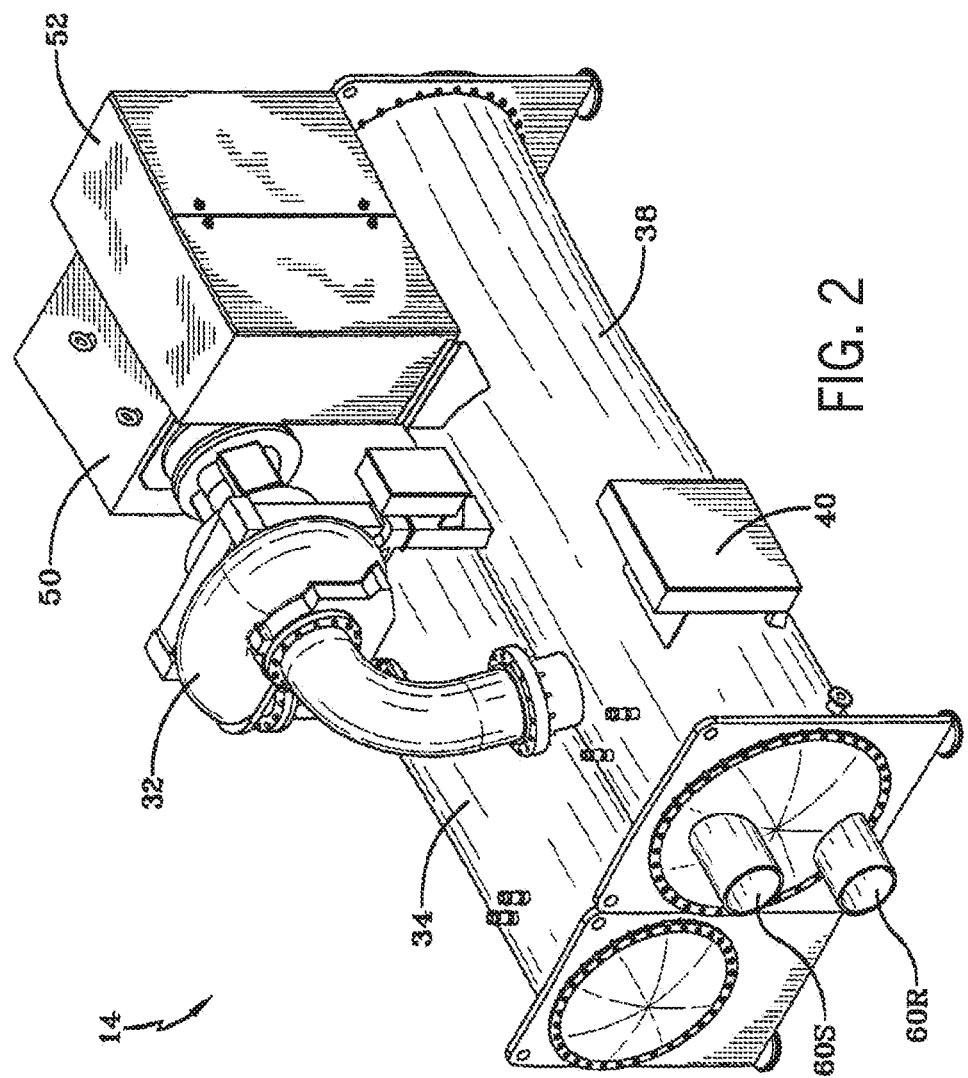
FIG. 2 is a perspective view of an embodiment of a vapor compression system, in accordance with an aspect of the present disclosure.
Figure 3:
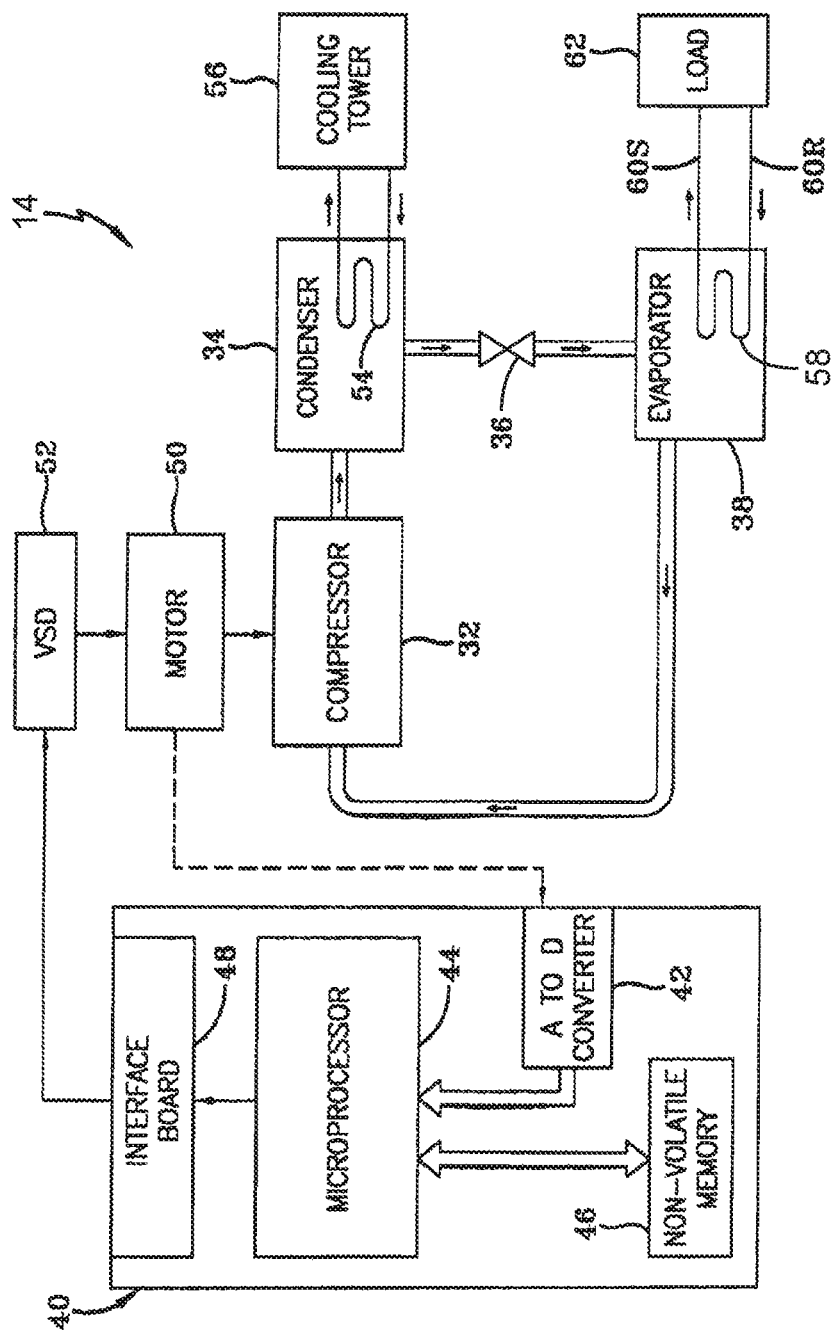
FIG. 3 is a schematic of an embodiment of a vapor compression system, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 (e.g., controller) that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro-olefin (HFO), "natural" refrigerants like ammonia (NH3), R-717, carbon dioxide (CO2), R-744, or hydrocarbon based refrigerants, water vapor, refrigerants with low global warming potential (GWP), or any other suitable refrigerant. In some embodiments, the vapor compression system 14 may be configured to efficiently utilize refrigerants having a normal boiling point of about 19 degrees Celsius (66 degrees Fahrenheit or less) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The refrigerant liquid from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The refrigerant liquid delivered to the evaporator 38 may absorb heat from another cooling fluid, which may or may not be the same cooling fluid used in the condenser 34. The refrigerant liquid in the evaporator 38 may undergo a phase change from the refrigerant liquid to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the refrigerant vapor exits the evaporator 38 and returns to the compressor 32 by a suction line to complete the cycle.

Figure 4:
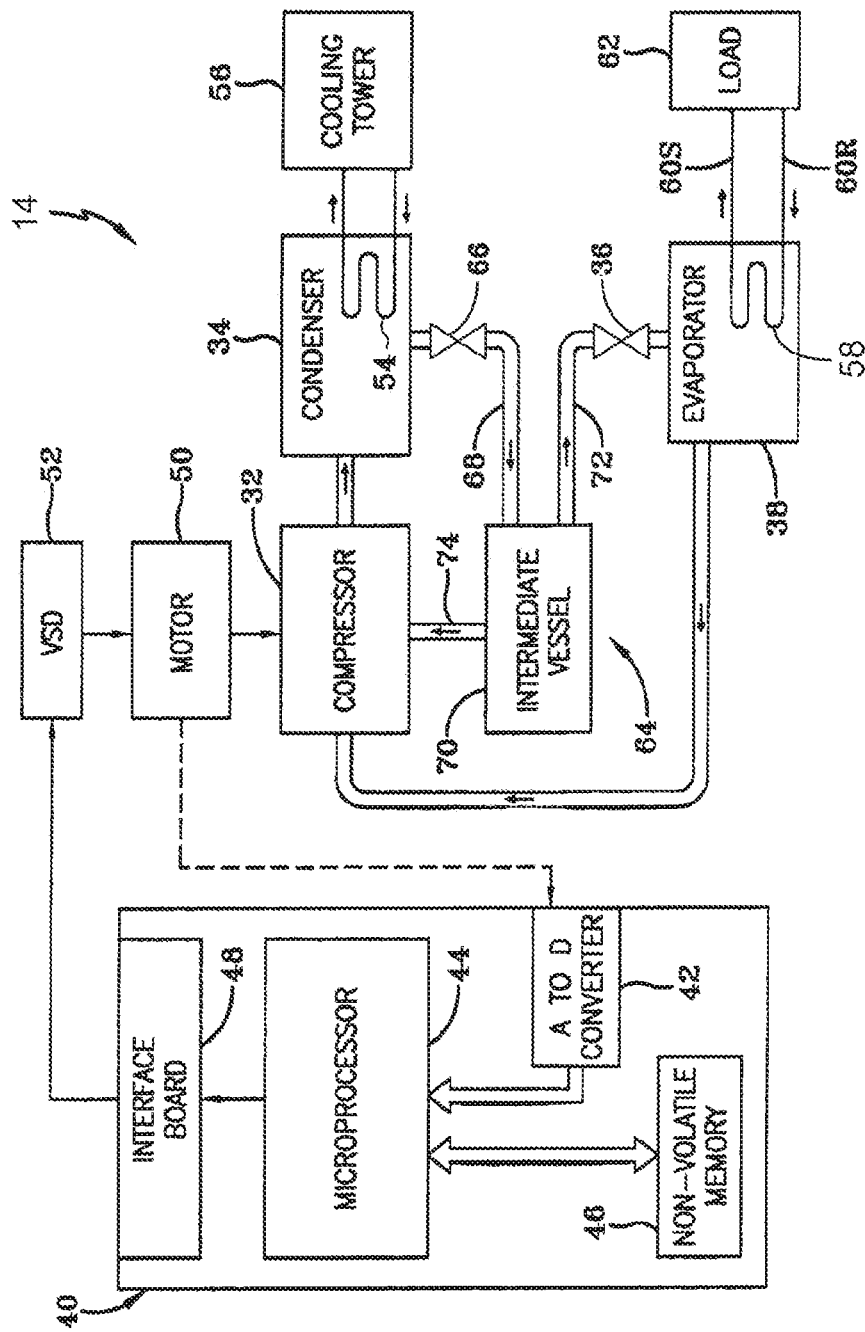
FIG. 4 is a schematic of another embodiment of a vapor compression system, in accordance with an aspect of the present disclosure.

FIG. 4 is a schematic view of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the refrigerant liquid received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the refrigerant liquid because of a pressure drop experienced by the refrigerant liquid when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the refrigerant liquid exiting the condenser 34 because of the expansion in the expansion device 66 and/or the intermediate vessel 70. The liquid from intermediate vessel 70 may then flow in line 72 through a second expansion device 36 to the evaporator 38.

An HVAC&R system may include a compressor having an impeller that is configured to rotate to pressurize a working fluid flowing through the HVAC&R system. During an active operating mode of the HVAC&R system, the impeller may be driven (e.g., by a motor) to rotate in a first rotational direction to pressurize the working fluid and to direct the working fluid through the HVAC&R system. In some cases, the HVAC&R system may transition to an inactive operating mode, in which the impeller is no longer driven in the first rotational direction (e.g., by the motor), thereby causing a flow of the working fluid through the HVAC&R system to be reduced and/or stopped. In some cases, when the impeller is not driven to rotate in the first rotational direction, the working fluid may flow through the compressor in an opposite direction relative to the flow of the working fluid in the active operating mode. Accordingly, the flow of the working fluid may be utilized to reduce the rotational speed of the impeller in the first rotational direction. When the rotational speed of the impeller is reduced below a threshold rotational speed, the HVAC&R system may be in an idle state, such that the active operating mode may be initiated or re-initiated (e.g., via a controller of the HVAC&R system) and/or maintenance may be performed on the HVAC&R system. The HVAC&R system may include a braking system that utilizes pre-rotation vanes (PRVs) and/or a variable geometry diffuser (VGD) to adjust the flow of the working fluid and reduce the speed of the impeller. Accordingly, the braking system may quickly reduce the rotational speed of the impeller below the threshold rotational speed and, therefore, may quickly achieve the idle state to enable the HVAC&R system to initiate or restart another the active operating mode.

Although this disclosure primarily discusses utilizing the braking system to facilitate suspending or shutting down operation of a compressor in a vapor compression system, it should be noted that the braking system may additionally or alternatively be used to suspend or shut down operation of any suitable compressor or turbomachine.

Figure 5:
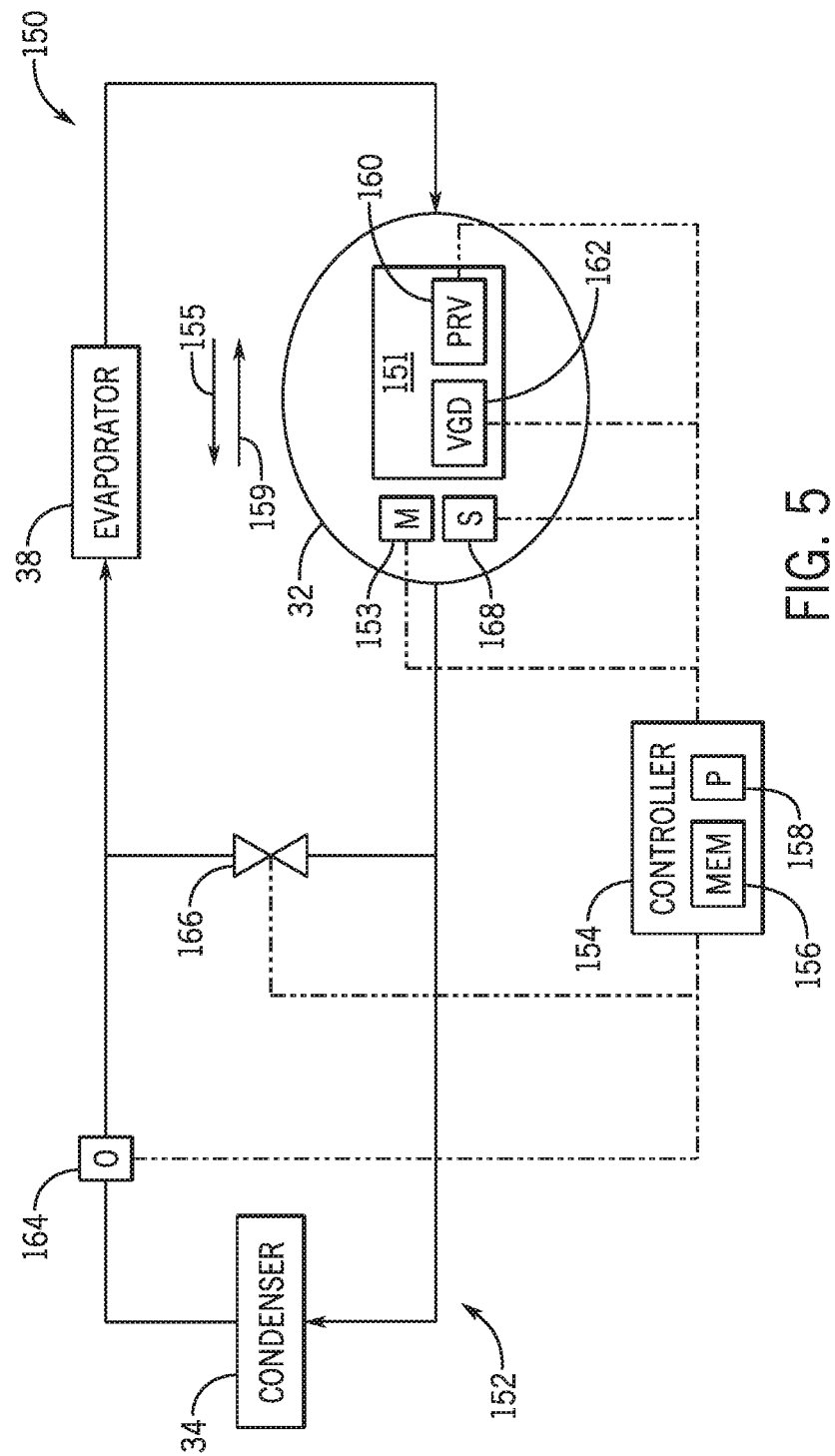
FIG. 5 is a schematic of an embodiment of an HVAC&R system having an improved braking system for a compressor, in accordance with an aspect of the present disclosure.

FIG. 5 is a schematic of an embodiment of a heating, ventilation, air conditioning, and refrigeration (HVAC&R) system 150 that may include a braking system 151. The braking system 151 may be used to reduce a speed of an impeller of a compressor when the HVAC&R system 150 transitions from an active operating mode to an inactive operating mode. As shown in the illustrated embodiment of FIG. 5, the HVAC&R system 150 may include the compressor 32, the condenser 34, and/or the evaporator 38 disposed along a working fluid circuit 152 configured to direct a working fluid through the HVAC&R system 150. The working fluid circuit 152 may include components such as pumps, valves, tubing, conduits, and so forth to direct the working fluid through various components of the HVAC&R system 150. During the active operating mode, the compressor 32 is configured to receive the working fluid from the evaporator 38, pressurize the working fluid, and direct the pressurized working fluid to the condenser 34. The working fluid may then flow from the condenser 34 to the evaporator 38 and back to the compressor 32.

In certain embodiments, the compressor 32 may be a centrifugal compressor having an impeller configured to rotate while the HVAC&R system 150 is in the active operating mode. For instance, the impeller may be driven by a motor 153 that transfers torque to the impeller (e.g., via a shaft) and causes the impeller to rotate. As the impeller rotates, working fluid of the HVAC&R system 150 is drawn and/or forced into the compressor 32, pressurized, and discharged from an outlet of the compressor 32. Thus, the compressor 32 causes the working fluid to flow in a first flow direction 155 across the compressor 32. In some embodiments, the HVAC&R system 150 may include a controller 154 that is communicatively coupled to the compressor 32 and is configured to control operation of the compressor 32 (e.g., a speed of the impeller, an operation of the braking system 151). The controller 154 may include a memory 156 and a processor 158. The memory 156 may include volatile memory, such as random access memory (RAM), and/or non-volatile memory, such as read-only memory (ROM), optical drives, hard disc drives, or solid-state drives to store instructions for operating the compressor 32 and/or another suitable component of the HVAC&R system 150. The processor 158 is configured to execute such instructions. For example, the processor 158 may include one or more application specific integrated circuits (ASICs), one or more field programmable gate arrays (FPGAs), one or more general purpose processors, or any combination thereof. During operation of the compressor 32, the controller 154 may adjust an amount of power supplied to the motor 153 (e.g., via the variable speed drive 52) to control a rotational speed of the impeller of the compressor 32. The rotation of the impeller may impart a centrifugal force on the working fluid, direct the working fluid through various components (e.g., a diffuser and/or a volute) of the compressor 32, and ultimately pressurize the working fluid.

When the HVAC&R system 150 transitions from the active operating mode to the inactive operating mode, the operation of the compressor 32 may be suspended and the controller 154 may no longer control the motor 153 to actively rotate the impeller. Thus, the compressor 32 does not actively direct the working fluid through the HVAC&R system 150 (e.g., toward the condenser 34). However, the impeller may still passively rotate for a period of time after the transition because of inertia and/or momentum from the impeller rotation driven during the active operating mode. Additionally, after the HVAC&R system 150 transitions to the inactive operating mode and the compressor 32 has shut down, the pressure of the working fluid in the condenser 34 may be greater than the pressure of the working fluid in the evaporator 38. As a result, the working fluid may flow from the condenser 34 toward the evaporator 38, such as through the compressor 32 in a second flow direction 159 opposite the first flow direction 155. Existing HVAC&R systems may limit the flow of the working fluid from the condenser 34 toward the evaporator 38 by controlling a fluid flow adjustment features (e.g., PRVs 160 and/or a VGD 162) immediately after transitioning to the inactive operating mode. Embodiments of the present disclosure utilize the flow of the working fluid through the compressor 32 to reduce a speed of the passive rotation of the impeller, such as by utilizing the flow of the working fluid to impart a force onto the impeller that acts against the passive rotation of the impeller. In other words, the flow of working fluid in the second flow direction 159 (e.g., a backflow of working fluid) may slow the passive rotation of the impeller of the compressor 32 to enable the impeller to more quickly reach an idle state or condition. In some cases, the flow of the working fluid may eventually drive the impeller to rotate in a reverse direction (e.g., a first circumferential direction) relative to the passive or active rotation of the impeller (e.g., a second circumferential direction). Accordingly, the braking system 151 may be configured to adjust the respective positions of the fluid flow adjustment features (e.g., the PRVs 160 and/or the VGD 162) of the compressor 32 to limit and/or otherwise avoid rotation of the impeller in the reverse direction by controlling the flow of the working fluid flowing toward the compressor 32 from the condenser 34.

It is now recognized that quickly reducing the rotational speed of the impeller when the HVAC&R system 150 transitions from the active operating mode to the inactive operating mode may reduce a down time of the HVAC&R system 150. For example, reducing the rotational speed of the impeller may enable the HVAC&R system 150 to be placed in the idle condition or state that may enable the HVAC&R system 150 to transition back to the active operating mode more quickly. Thus, quickly reducing the rotational speed of the impeller below a rotational speed threshold may enable the HVAC&R system 150 to restart or resume operating in the active operation mode more quickly and/or to limit movement of the impeller (e.g., for enabling maintenance of the compressor 32).

As set forth above, embodiments of the braking system 151 enable the backflow of working fluid through the compressor 32 in order to reduce the rotational speed of the impeller of the compressor 32. The braking system 151 may also be configured to control operation of the compressor 32 to avoid rotation of the impeller in the reverse direction. To this end, after a period of time after the transition from the active operating mode to the inactive operating mode, the backflow of working fluid through the compressor 32 may be restricted and/or blocked to reduce the force imparted on the impeller by the backflow of working fluid and to avoid rotation of the impeller in the reverse direction. In some embodiments, the controller 154 may be communicatively coupled to PRVs 160 and/or the variable geometry diffuser (VGD) 162 of the compressor 32, and the controller 154 is configured to adjust a respective position of the PRV 160 and/or the VGD 162 to control the backflow of working fluid through the compressor 32. Generally, during the active operating mode of the HVAC&R system 150, the controller 154 may adjust the position of the PRV 160 to change a flow rate (e.g., volumetric flow rate in a first direction), discharge pressure, volumetric ratio, and/or another suitable operating parameter of the compressor 32. Additionally or alternatively, during the active operating mode, the controller 154 may adjust the position of the VGD 162 to change the flow rate (e.g., volumetric flow rate in a first direction), discharge pressure, volumetric ratio, and/or another suitable parameter of the compressor 32.

During the transition between the active operating mode and the inactive operating mode, the controller 154 may adjust the position of the PRV 160 and/or of the VGD 162 to control the flow rate (e.g., a volumetric flow rate in a second direction) of the working fluid flowing from the condenser 34 and through the compressor 32. For example, when the HVAC&R system 150 transitions from the active operating mode to the inactive operating mode, the controller 154 may initially set the position of the PRV 160 and/or of the VGD 162 to enable at least some backflow of the working fluid through the compressor 32 to reduce the rotational speed of the impeller. After a period of time, the controller 154 may then change the position of the PRV 160 and/or of the VGD 162 to restrict and/or block the backflow of the working fluid through the compressor 32 to avoid rotation of the impeller in the reverse direction. In other words, the controller 154 may set the position of the PRV 160 and/or of the VGD 162 to a first target position (e.g., an open position) that enables a target backflow rate of the working fluid through the compressor 32 for an initial time interval. After the initial time interval, the controller 154 may then set the position of the PRV 160 and/or the VGD 162 to a second target position (e.g., a closed position) that blocks backflow of the working fluid through the compressor 32. In this manner, the braking system 151 may quickly reduce the speed of the impeller and also avoid rotation of the impeller in the reverse direction.

In some embodiments, after the controller 154 adjusts the position of the PRV 160 and/or of the VGD 162 to the second target position (e.g., the closed position), there may still be a pressure differential between the working fluid in the condenser 34 and the working fluid in the evaporator 38. As such, backflow of the working fluid in the second flow direction 159 may still be induced. To control the flow rate of the working fluid from the condenser 34 toward the evaporator 38 via the compressor 32, the controller 154 may also be configured to control a position of a variable orifice 164 and/or of a hot gas bypass valve 166 to further block rotation of the impeller in the reverse direction. In general, during the active operating mode of the HVAC&R system 150, the controller 154 may be configured to adjust a position of the variable orifice 164 to control a flow rate of the working fluid flowing directly from the condenser 34 to the evaporator 38 and bypassing the compressor 32. For example, the variable orifice 164 may be the expansion valve or device 36 or another suitable component that is configured to control the flow of the working fluid from the condenser 34 to the evaporator 38 in the active operating mode. Additionally, during the active operating mode, the controller 154 may control a position of the hot gas bypass valve 166 to control a flow rate of the working fluid flowing directly from the compressor 32 to the evaporator 38. That is, the hot gas bypass valve 166 may enable pressurized working to be directed to the evaporator 38, such as to maintain an operation of the compressor 32 and/or avoid freezing conditions within the evaporator 38.

During the transition between the active operating mode and the inactive operating mode, the controller 154 may change the position of the variable orifice 164 and/or the hot gas bypass valve 166 to enable the pressure of the working fluid to equalize between the condenser 34 and the evaporator 38, such that there is substantially no pressure differential between the working fluid in the condenser 34 and the working fluid in the evaporator 38 (e.g., across the compressor 32). As an example, upon initiation of the transition from the active operating mode to the inactive operating mode, the controller 154 may set the position of the variable orifice 164 and/or the hot gas bypass valve 166 to a first target position to enable a portion of the working fluid flowing from the condenser 34 to bypass the compressor 32 and flow directly toward the evaporator 38 via the variable orifice 164 and/or the hot gas bypass valve 166. After the controller 154 has adjusted the HVAC&R system 150 to restrict the backflow of the working fluid through the compressor 32 (e.g., by closing the PRV 160 and/or the VGD 162), the controller 154 may also set the position of the variable orifice 164 and/or of the hot gas bypass valve 166 to a second target position. The second target position of the variable orifice 164 and/or the hot gas bypass valve 166 may increase a flow rate of the working fluid flowing between the condenser 34 and the evaporator 38 and bypassing the compressor 32 relative to the first target position. Additionally or alternatively, the controller 154 may adjust the position of the variable orifice 164 and/or the hot gas bypass valve 166 based on an operating parameter of the HVAC&R system 150, such as a detected pressure differential between the working fluid in the condenser 34 and the working fluid in the evaporator 38 (e.g., across the compressor 32). By way of example, the controller 154 may set the position of the variable orifice 164 and/or the hot gas bypass valve 164 to increase the flow rate of the working fluid flowing directly from the condenser 34 to the evaporator 38 (i.e., bypassing the compressor 32) when there is a relatively high pressure differential between the working fluid in the condenser 34 and the working fluid in the evaporator 38, thereby enabling pressure to equalize between the condenser 34 and the evaporator 38.

In some embodiments, the controller 154 may be communicatively coupled to a sensor 168 (e.g., one or more sensors) of the HVAC&R system 150, and may be configured to adjust operation of the HVAC&R system 150 based on feedback from the sensor 168. For example, the controller 154 may adjust the respective positions of the PRV 160, the VGD 162, the variable orifice 164, and/or the hot gas bypass valve 166 based on the feedback transmitted by the sensor 168. In some embodiments, the feedback of the sensor 168 may be indicative of time, such as an amount of time that has passed after initiating the transition from the active operating mode to the inactive operating mode. As such, the controller 154 may set and maintain the position of the PRV 160 and/or the VGD 162 to enable the backflow of the working fluid through the compressor 32 until the feedback from the sensor 168 indicates a first time interval threshold has elapsed. The controller 154 may also set and maintain the position of the variable orifice 164 and/or the hot gas bypass valve 166 for the first time interval threshold. Once the first interval of time threshold has been reached, the controller 154 may change the position of the PRV 160 and/or the VGD 162 to a position that blocks the backflow of the working fluid from the condenser 34 through the compressor 32. The controller 154 may then maintain the position of the variable orifice 164 and/or the hot gas bypass valve 166 for a second time interval threshold (e.g., beginning after the first time interval threshold has been reached), such as until the HVAC&R system 150 incurs a load demand and is to be operated in the active operating mode again. After the first time interval threshold has elapsed, the controller 154 may also change the position of the variable orifice 164 and/or the hot gas bypass valve 166 to a different position. The controller 154 may then maintain the position of the variable orifice 164 and/or the hot gas bypass valve 166 for the second time interval threshold.

In additional or alternative embodiments, the feedback from the sensor 168 may be indicative of a rotational speed of the impeller of the compressor 32. For instance, when the feedback indicates that the rotational speed of the impeller is above a threshold rotational speed (e.g., 10 rotations per second or Hertz [Hz]), the controller 154 may set the position of the PRV 160 and/or the VGD 162 to enable backflow of the working fluid through the compressor 32. When the feedback indicates that the rotational speed falls below the threshold rotational speed, the controller 154 may change the position of the PRV 160 and/or the VGD 162 to restrict and/or block the backflow of the working fluid through the compressor 32 and avoid driving the impeller in the reverse direction (e.g., a direction opposite to a circumferential direction of rotation during the active operating mode). Similarly, when the feedback indicates that the rotational speed of the impeller is above the threshold rotational speed, the controller 154 may set the variable orifice 164 and/or the hot gas bypass valve 166 at respective first positions. When the feedback indicates that the rotational speed of the impeller is below the threshold rotational speed, the controller 154 may set the variable orifice 164 and/or the hot gas bypass valve 166 at respective second positions to restrict backflow of the working fluid.

In some embodiments, the feedback received from the sensor 168 may be indicative of another suitable operating parameter of the HVAC&R system 150, such as the pressure differential between the working fluid in the condenser 34 and the working fluid in the evaporator 38 (e.g., across the compressor 32), a flow rate of the working fluid, and the like. It should also be noted that a value of the operating parameter (e.g., an operating parameter threshold) at which the controller 154 may change the position of the PRV 160 and/or the VGD 162 may be based on an operating condition of the HVAC&R system 150. As an example, when the load demand on the HVAC&R system 150 is relatively high, the controller 154 may cause the impeller to rotate at an increased rotational speed. Thus, upon transitioning to the inactive operating mode from the active operating mode, an increased amount of backflow of the working fluid may be used to reduce the rotational speed of the impeller below the rotational speed threshold. For this reason, the controller 154 may be configured to change the position of the PRV 160 and/or the VGD 162 at a different value of the operating parameter threshold (e.g., a later time). Additionally or alternatively, the operating parameter threshold may be based on a specification (e.g., a size and/or capacity) of a component of the HVAC&R system 150 (e.g., a size of the impeller).

In certain embodiments, the controller 154 may set the operating parameter threshold by referencing a lookup or database table (e.g., stored in the memory 156). The lookup table may include a list of operating parameter thresholds based on specifications and/or operating parameters (e.g., load demands) of the HVAC&R system 150. Thus, the controller 154 may use the lookup table to match a particular configuration and/or operating parameter of the HVAC&R system 150 with a corresponding value of the operating parameter threshold. Thereafter, the controller 154 may set the operating parameter threshold accordingly. Additionally or alternatively, the controller 154 may determine and set the operating parameter threshold by using an algorithm (e.g., an equation) that is based on the configuration and/or operating parameter of the HVAC&R system 150. In other words, the controller 154 may receive inputs indicative of the HVAC&R system 150 configuration and/or operating parameters of the HVAC&R system 150 to calculate the operating parameter threshold.

It should be noted that in further embodiments, the position of the PRV 160 and/or the VGD 162 may be directly related to the feedback received from the sensor 168. That is, the controller 154 may dynamically adjust the position of the PRV 160 and/or the VGD 162 based on the feedback. For instance, when the feedback indicates that a rotational speed of the impeller decreases, the controller 154 may also gradually (e.g., proportionally) adjust the respective positions of the PRV 160 and/or the VGD 162 toward the closed position.

Figure 6:
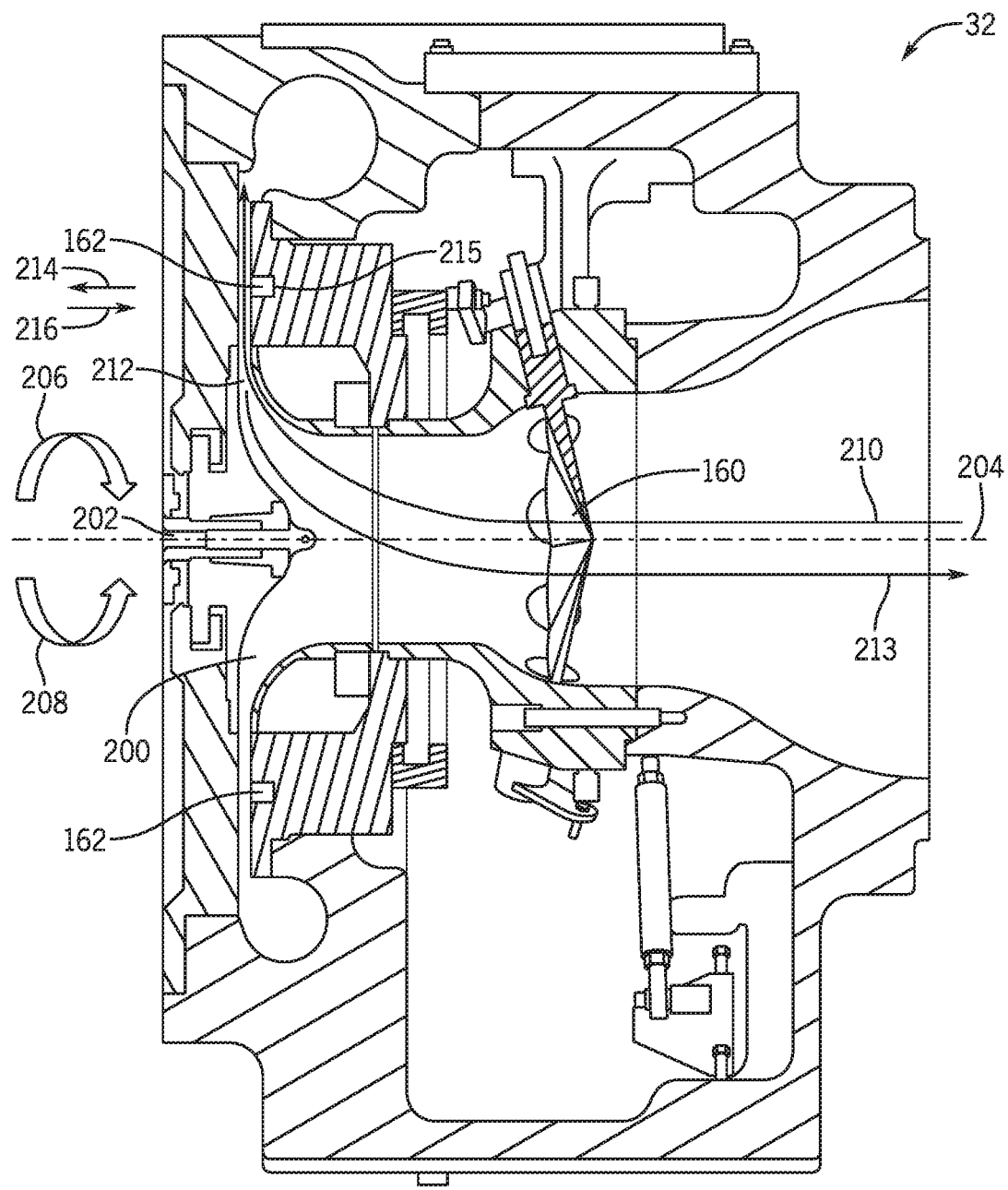
FIG. 6 is a cross-sectional side view of an embodiment of a compressor having an improved braking system, in accordance with an aspect of the present disclosure.

FIG. 6 is a cross-sectional side view of an embodiment of the compressor 32 that may be employed by the HVAC&R system 150 of FIG. 5. The compressor 32 includes an impeller 200 coupled to a shaft 202 of the compressor 32. During operation of the HVAC&R system 150, the shaft 202 may rotate about a longitudinal axis 204 (e.g., via the motor 153), thereby causing the impeller 200 to rotate about the longitudinal axis 204. For example, the motor 153 may drive the shaft 202 and the impeller 200 to rotate in a first rotational direction 206 (e.g., a first circumferential direction) about the longitudinal axis 204 in the active operating mode. During the transition from the active operating mode to the inactive operating mode, the controller 154 may adjust the positions of the PRV 160 and/or the VGD 162 to enable the backflow of the working fluid through the compressor 32 in order to reduce the rotational speed of the impeller 200 in the first rotational direction 206 and to block rotation of the impeller 200 in a second rotational direction 208 opposite the first rotational direction 206 (e.g., a direction opposite the first circumferential direction).

During the active operating mode, rotation of the impeller 200 in the first rotational direction 206 may draw the working fluid from the evaporator 38 through the compressor 32 along a first flow direction 210. The working fluid may flow through the PRV 160, through the impeller 200, and then toward a diffusion passage 212, where kinetic energy of the working fluid is converted to pressure energy, thereby increasing the pressure of the working fluid. The pressurized working fluid may then be directed to the condenser 34. During the transition between the active operating mode and the inactive operating mode, the working fluid may flow in a second flow direction 213 (i.e., the backflow) that is opposite the first flow direction 210, such as from the condenser 34 through the diffusion passage 212, through the impeller 200, and through the PRV 160 toward the evaporator 38. The backflow of the working fluid may impart a force on the impeller 200 that reduces the rotational speed of the impeller 200 in the first rotational direction 206 by imparting a force on the impeller 200 in the second rotational direction 208.

The position of the PRV 160 may be adjusted to change an amount (e.g., a volumetric flow rate) of the working fluid flowing through the compressor 32. By way of example, in the active operating mode, the controller 154 may adjust the position of the PRV 160 between an open position to increase an amount of working fluid drawn into the compressor 32 and directed toward the impeller 200 and a closed position to reduce an amount of working fluid drawn into the compressor 32 and directed toward the impeller 200. The controller 154 may also adjust the position of the PRV 160 to intermediate positions between the open position and the closed position to control an amount of the working fluid drawn into the compressor 32 in the first flow direction 210. During the transition from the active operating mode to the inactive operating mode, the controller 154 may initially set the position of the PRV 160 at the open position or one of the intermediate positions to enable backflow of the working fluid in the second flow direction 213. After a time interval has elapsed, the controller 154 may set the position of the PRV 160 to the closed position to block the backflow of the working fluid through the compressor 32 in the second flow direction 213.

The position of the VGD 162 may also be adjusted to change a flow rate (e.g., a volumetric flow rate), a discharge pressure, and/or a volumetric ratio of the working fluid through compressor 32 (e.g., the diffusion passage 212). For instance, the VGD 162 may be disposed in a recess 215 positioned adjacent to the diffusion passage 212, and a position of the VGD 162 with respect to the diffusion passage 212 may be adjusted to change a geometry (e.g., a cross-sectional area) of the diffusion passage 212. The controller 154 may move the VGD 162 in a first direction 214 to reduce the cross-sectional area of the diffusion passage 212 (e.g., to increase the pressure of the working fluid in the diffusion passage 212) and/or move the VGD 162 in a second direction 216 to increase the cross-sectional area of the diffusion passage 212 (e.g., to reduce the pressure of the working fluid in the diffusion passage 212). During the transition from the active operating mode to the inactive operating mode, the controller 154 may initially set the position of the VGD 162 to enable some backflow of the working fluid through the diffusion passage 212 in the second flow direction 213. After a time interval has elapsed, the controller 154 may then drive the VGD 162 to move in the first direction 214 to close the diffusion passage 212, thereby blocking the backflow of the working fluid through the diffusion passage 212 and through the compressor 32 in the second flow direction 213.

FIG. 7 is a flowchart of an embodiment of a method or process 250 for operating the braking system 151 of the HVAC&R system 150 described above with respect to FIGS. 5 and 6. In some embodiments, the method 250 may be performed by a controller, such as the controller 154. It should be noted that a method different than the method 250 may be performed to operate the braking system 151 of the HVAC&R system 150, such as for a different embodiment of the HVAC&R system 150. For example, other steps may be performed in addition to the steps depicted in FIG. 7, and/or certain steps of the method 250 may be modified and/or removed.

At block 252, an indication and/or a signal of a load demand may be received to operate the HVAC&R system 150 in the inactive operating mode (e.g., an idle state and/or an operating mode in which the compressor 32 no longer pressurizes the working fluid). In one example, the indication may be a user input to shut down the HVAC&R system 150 and thus transition operation of the HVAC&R system 150 from the active operating mode to the inactive operating mode. That is, the user input may override a current operating mode (e.g., the active operating mode) of the HVAC&R system 150 and initiate the transition to the inactive operating mode of the HVAC&R system 150. In another example, the inactive operating mode of the HVAC&R system 150 may be initiated based on an operating parameter (e.g., feedback received from the sensor 168), such as a current temperature of a space or component conditioned by the HVAC&R system 150, a desired temperature of a space or component conditioned by the HVAC&R system 150, a temperature of the conditioning fluid directed through the HVAC&R system 150, another suitable parameter, or any combination thereof.

In response to a determination that the HVAC&R system 150 is to be operated in the inactive operating mode, components of the HVAC&R system 150 may be configured and/or adjusted to enable backflow of the working fluid from the condenser 34 through the compressor 32 for a first time interval, as indicated at block 254. For example, the operation of the compressor 32 may be suspended (e.g., the controller 154 may instruct the motor 153 to discontinue applying a rotational force to the shaft 202 coupled to the impeller 200) upon initiation of the transition from the active operating mode to the inactive operating mode. As such, the impeller 200 is not driven to rotate in the first rotational direction 206 or to actively direct working fluid from the evaporator 38 through the compressor 32 and toward the condenser 34.

Moreover, the position of the PRV 160 and/or the VGD 162 may be set to an open position (e.g., a first target position) upon initiation of the transition from the active operating mode to the inactive operating mode. That is, the PRV 160 and/or the VGD 162 may be actuated to open and enable backflow of the working fluid through the compressor 32, and the working fluid may impart a force on the impeller 200 to reduce a rotational speed of the impeller 200 in the first rotational direction 206. In some embodiments, the position of the variable orifice 164 and/or the hot gas bypass valve 166 may also be set to enable the working fluid to flow directly from the condenser 34 to the evaporator 38 instead of through the compressor 32 in the second flow direction 213. In alternative embodiments, the variable orifice 164 and/or the hot gas bypass valve 166 may be closed to block the working fluid from flowing directly from the condenser 34 to the evaporator 38. As such, substantially all of the working fluid in the condenser 34 may be directed through the compressor 32 in the second flow direction 213 to reduce the rotational speed of the impeller 200.

After the first time interval has elapsed, the position of the PRV 160 and/or the VGD 162 may be adjusted to restrict and/or block the backflow of the working fluid through the compressor 32, as shown at block 256. In other words, the PRV 160 and/or the VGD 162 may be adjusted to a closed position to block the backflow of the working fluid through the impeller 200 and the compressor 32 in the second flow direction 213. Thus, the backflow of the working fluid no longer imparts an opposing force on the impeller 200, and rotation of the impeller 200 in the second rotational direction 208 may be avoided. The position of the PRV 160 and/or the VGD 162 may then be maintained for a second time interval, and the impeller 200 may be in an idle position (e.g., not rotating in the first rotational direction 206 or the second rotational direction 208) and/or further reduced due to inertia (e.g., frictional forces). At the second time interval, the position of the variable orifice 164 and/or the hot gas bypass valve 166 may also be adjusted to enable pressure equalization between the condenser 34 and the evaporator 38 (e.g., across the compressor 32) by enabling the working fluid to flow directly from the condenser 34 to the evaporator 38. For instance, the position of the variable orifice 164 and/or the hot gas bypass valve 166 may be adjusted to increase the flow rate of the working fluid flowing directly between the condenser 34 and the evaporator 38. As such, the pressure differential between the condenser 34 and the evaporator 38 may be reduced in the inactive operating mode of the HVAC&R system 150.

After the rotational speed of the impeller 200 has been reduced below the rotational speed threshold, it may be determined that the HVAC&R system 150 is in an idle condition or state, as indicated at block 258. When the HVAC&R system 150 has achieved the idle condition or state, the active operating mode may be initiated to actively drive the impeller 200 to direct the working fluid from the evaporator 38, through the compressor 32, and toward the condenser 34 in the first flow direction 210. It should be noted that performing the method 250 may place the HVAC&R system 150 in the idle condition or state more quickly than existing approaches, which may not use the backflow of the working fluid to reduce the rotational speed of the impeller 200 during the transition from the active operating mode to the inactive operating mode.

FIG. 8 is a graphical illustration 280 of rotational speeds (e.g., in units Hz) of respective compressors over time (e.g., in units seconds) during the transition from the active operating mode to the inactive operating mode. As depicted in the graphical illustration 280, each respective compressor may be operated for a first time interval 282, in which the respective compressors are each driven at a first rotational speed 282 (e.g., the active operating mode). At a shutdown time 284, each compressor may begin the transition between the active operating mode and the inactive operating mode, at which point, the respective impellers are no longer actively driven (e.g., via the motor 153). Each compressor shutdown operation may achieve the idle condition or state when the rotational speeds of the impellers of the respective compressors fall below a rotational speed threshold 286. For example, the rotational speed threshold 286 may be approximately 0 Hz, indicating the respective impellers are rotating at a low rotational speed. In other embodiments, the rotational speed threshold 286 may be between 0 Hz and 10 Hz, between 0 Hz and 5 Hz, or between 0 Hz and 1 Hz.

A first curve 288 represents a first compressor shutdown operation, in which the PRV 160 and the VGD 162 are adjusted to a closed position upon initiation of the transition from the active operating mode to the inactive operating mode. In other words, the backflow of the working fluid through the compressor is quickly blocked and thus is not used to reduce the rotational speed of the impeller of the compressor. Thus, the rotational speed of the impeller may gradually decrease due to inertia and/or frictional forces imparted on the impeller. As shown in the graphical illustration 280, the rotational speed of the impeller represented by the first curve 288 reaches the rotational speed threshold 286 at time 290 (e.g., between 50 and 80 seconds after the shutdown time 284).

A second curve 292 represents a second compressor shutdown operation, in which the PRV 160 and the VGD 162 are maintained in an open position or a partially open position during the entire transition from the active operating mode to the inactive operating mode. Thus, the backflow of the working fluid may be enabled through the compressor throughout the duration of the second compressor shutdown operation. Initially, the backflow of the working fluid may reduce the rotational speed of the impeller to substantially 0 Hz at time 294. However, continuous backflow of the working fluid may drive the impeller in the second rotational direction 208 after the time 294. The rotational speed of the impeller in the second rotational direction 208 may increase until a time 296. After the time 296, the rotational speed of the impeller may gradually reduce toward the rotational speed threshold 286 at time 298. As shown in FIG. 8, the time 298 (e.g., between 30 and 50 seconds after the shutdown time 284) is reached before time 290 with respect to the shutdown time 284.

A third curve 300 represents a third compressor shutdown operation, which utilizes the braking system 151 described above during the transition from the active operating mode to the inactive operating mode. For example, the position of the PRV 160 and the VGD 162 may initially be adjusted to an open position to enable the backflow of the working fluid through the compressor. Thus, the rotational speed of the impeller may initially decrease at a similar rate as the rotational speed of the impeller in the second compressor shutdown operation (e.g., as represented by the second curve 292). At time 302 (e.g., between 2 seconds and 5 seconds after the shutdown time 284), the PRV 160 and the VGD 162 may be adjusted to a closed position to block the backflow of the working fluid through the compressor. After time 302, the rotational speed of the impeller may gradually decrease (e.g., due to inertia and/or frictional forces) and may fall below the rotational speed threshold 286 at a time 304. As shown in the illustrated embodiment of FIG. 8, the time 304 (e.g., between 10 seconds and 30 seconds after the shutdown time 284) may be reached before both times 290 and 298 with respect to the shutdown time 284. In other words, the braking system 151 disclosed herein may achieve the idle condition or state more quickly than the first compressor shutdown operation (i.e., immediately blocking the backflow of the working fluid) and the second compressor shutdown operation (i.e., enabling continuous backflow of the working fluid). Furthermore, the braking system 151 achieves the idle condition or state without having the impeller rotate in the second rotational direction 208, as seen in the second compressor shutdown operation.

Embodiments of the present disclosure are directed to an HVAC&R system that uses a compressor having an impeller. The HVAC&R system may be operated in an active operating mode that drives the impeller to rotate in a first rotational direction to pressurize a working fluid and direct the working fluid through various components of the HVAC&R system in a first flow direction. The HVAC&R system may also be operated in an inactive operating mode, in which the impeller is not driven to rotate in the first rotational direction. During a transition period from the active operating mode to the inactive operating mode, a braking system may be utilized to quickly reduce a rotational speed of the impeller in the first rotational direction, such that the HVAC&R system quickly achieves an idle condition or state suitable for initiating the active operating mode. During the transition from the active operating mode to the inactive operating mode, the working fluid may flow through the compressor in a second flow direction (e.g., backflow direction) opposite the first flow direction as a result of a relatively high pressure within a condenser of the HVAC&R system. The flow of working fluid through the compressor in the second flow direction may impart a force on the impeller in a second rotational direction, opposite the first rotational direction, to reduce the rotational speed of the impeller in the first rotational direction. Furthermore, after a time interval, the braking system may be configured to block the flow of the working fluid through the compressor in the second flow direction to avoid driving the impeller in the second rotational direction. For example, after the time interval, a controller of the braking system may adjust a position of a pre-rotation vane and/or a variable geometry diffuser of the compressor to block the flow of working fluid through the compressor in the second flow direction.

While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
   a compressor comprising an impeller configured to rotate and drive a working fluid in a first direction through the compressor and through a working fluid circuit of the HVAC system in an active operating mode of the HVAC system; and
   a controller configured to, in response to receiving an input indicative of suspending operation of the HVAC system:
      suspend the active operating mode of the HVAC system by interrupting a supply of power to the compressor;
      adjust pre-rotation vanes of the compressor, a variable geometry diffuser of the compressor, or both to a first position to enable a backflow of the working fluid through the compressor in a second direction, opposite the first direction, for a first interval of time; and
      after the first interval of time has elapsed, adjust the pre-rotation vanes of the compressor, the variable geometry diffuser of the compressor, or both to a second position to block the backflow of the working fluid through the compressor.

2. The HVAC system of claim 1, wherein the first position of the pre-rotation vanes and/or the variable geometry diffuser is an open position or a partially open position.

3. The HVAC system of claim 1, wherein the second position of the pre-rotation vanes and/or the variable geometry diffuser is a closed position.

4. The HVAC system of claim 1, wherein the controller comprises a tangible, non-transitory, computer-readable medium storing executable instructions that, when executed by a processor, are configured to cause the processor to suspend the active operating mode of the HVAC system, adjust the pre-rotation vanes of the compressor, adjust the variable geometry diffuser of the compressor, or any combination thereof.

5. The HVAC system of claim 1, comprising:
   a motor configured to drive rotation of the impeller of the compressor during the active operating mode of the HVAC system; and
   a variable speed drive configured to supply the power to the motor.

6. The HVAC system of claim 5, wherein the controller is configured to suspend the active operating mode of the HVAC system by interrupting the power supplied to the motor via the variable speed drive.

7. The HVAC system of claim 1, wherein the controller is configured to receive feedback indicative of a rotational speed of the impeller and determine that the HVAC system is in an idle state in response to the feedback indicative of the rotational speed of the impeller being below a rotational speed threshold.

8. The HVAC system of claim 7, wherein the controller is configured to operate the HVAC in the active operating mode based on a determination that the HVAC system is in the idle state.

9. A heating, ventilation, and/or air conditioning (HVAC) system, comprising:
   a compressor comprising an impeller configured to rotate and direct a flow of working fluid through a working fluid circuit of the HVAC system;
   a motor configured to drive the impeller to rotate;
   a controller communicatively coupled to the motor, wherein the controller is configured to:
      manage supply of power to the motor to drive the impeller to rotate in an active operating mode of the HVAC system;
      receive an indication to operate the HVAC system in an inactive operating mode;
      interrupt the supply of power to the motor in response to receipt of the indication to operate the HVAC system in the inactive operating mode;
      adjust pre-rotation vanes and/or a variable geometry diffuser of the compressor to enable a backflow of the working fluid through the impeller for a first interval of time, wherein the backflow of the working fluid comprises flow of the working fluid from a condenser disposed along the working fluid circuit, through the impeller, and toward an evaporator disposed along the working fluid circuit in response to receipt of the indication to operate the HVAC system in the inactive operating mode; and
      adjust the pre-rotation vanes and/or the variable geometry diffuser to block the backflow of the working fluid through the impeller for a second interval of time after the first interval of time.

10. The HVAC system of claim 9, wherein the controller is configured to:
   receive feedback indicative of a rotational speed of the impeller being below a rotational speed threshold; and
   enable the supply of power to the motor in response to receiving the feedback indicative of the rotational speed of the impeller being below the rotational speed threshold in order to operate the HVAC system in the active operating mode.

11. The HVAC system of claim 9, comprising a sensor communicatively coupled to the controller, wherein the sensor is configured to transmit sensor feedback indicative of a time, wherein the controller is configured to adjust the pre-rotation vanes and/or the variable geometry diffuser to adjust the backflow of the working fluid based on the time.

12. The HVAC system of claim 9, comprising a variable orifice disposed along the working fluid circuit and configured to enable the working fluid to flow from the condenser directly to the evaporator.

13. The HVAC system of claim 12, wherein the controller, in response to receipt of the indication to operate the HVAC system in the inactive operating mode, is configured to:
   adjust the variable orifice to enable the working fluid to flow from the condenser directly to the evaporator at a first flow rate for the first interval of time; and
   adjust the variable orifice to enable the working fluid to flow from the condenser directly to the evaporator at a second flow rate, different from the first flow rate, for the second interval of time.

14. The HVAC system of claim 9, wherein the controller is configured to adjust the pre-rotation vanes and/or the variable geometry diffuser to enable a partial backflow of the working fluid through the impeller for a third interval of time between the first interval of time and the second interval of time.

15. A tangible, non-transitory, computer-readable medium comprising executable instructions that, when executed by a processor in response to receiving an input indicative of a transition of a heating, ventilation, and/or air conditioning (HVAC) system to operate in an inactive operating mode, are configured to cause the processor to:
   suspend operation of a compressor of the HVAC system in order to operate the HVAC system in the inactive operating mode, wherein the compressor comprises an impeller configured to rotate and thus drive a working fluid through a working fluid circuit of the HVAC system;
   receive feedback from a sensor indicative of an operating parameter of the compressor; and
   adjust a position of a fluid flow adjustment feature of the compressor to enable a flow of the working fluid in a backflow direction from a condenser of the HVAC system, through the compressor, and toward an evaporator of the HVAC system for an interval of time based on the feedback received from the sensor in the inactive operating mode of the HVAC system.

16. The tangible, non-transitory, computer-readable medium of claim 15, wherein the operating parameter is a time, a rotational speed of the impeller, a pressure differential across the compressor, a flow rate of the working fluid through the compressor, or any combination thereof.

17. The tangible, non-transitory, computer-readable medium of claim 15, wherein the executable instructions, when executed by the processor, are configured to cause the processor to adjust a position of a hot gas bypass valve to enable the working fluid to flow from the condenser of the HVAC system directly to the evaporator of the HVAC system in the inactive operating mode of the HVAC system.

18. The tangible, non-transitory, computer-readable medium of claim 15, wherein the executable instructions, when executed by the processor, are configured to cause the processor to:
   receive additional feedback indicative that a rotational speed of the impeller is below a rotational speed threshold; and
   operate the HVAC system in an active operating mode and rotate the impeller to drive the working fluid through the working fluid circuit of the HVAC system based on receiving the additional feedback.

19. The tangible, non-transitory, computer-readable medium of claim 15, wherein the input is indicative of the transition of the HVAC system to the inactive operating mode from an active operating mode.

20. The tangible, non-transitory, computer-readable medium of claim 15, wherein the fluid flow adjustment feature comprises pre-rotation vanes, a variable geometry diffuser, or both.

* * * * *